United States Patent
Keum et al.

(10) Patent No.: US 12,074,505 B2
(45) Date of Patent: Aug. 27, 2024

(54) SYSTEMS, APPARATUSES, AND METHODS FOR ACTIVE END-TURN COOLING FOR AN ELECTRIC MOTOR WITH FOUR-BAR LINKAGES

(71) Applicant: GM GLOBAL TECHNOLOGY OPERATIONS LLC, Detroit, MI (US)

(72) Inventors: SeungHwan Keum, Northville, MI (US); Jun-mo Kang, Ann Arbor, MI (US); Insu Chang, Troy, MI (US); Young J. Kim, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 580 days.

(21) Appl. No.: 17/305,642

(22) Filed: Jul. 12, 2021

(65) Prior Publication Data
US 2023/0009660 A1   Jan. 12, 2023

(51) Int. Cl.
H02K 9/19       (2006.01)
H02K 7/10       (2006.01)

(52) U.S. Cl.
CPC ........... *H02K 9/19* (2013.01); *H02K 7/10* (2013.01); *H02K 2209/00* (2013.01)

(58) Field of Classification Search
CPC .................................................. H02K 2209/00
USPC ........................................... 310/52–60 A
See application file for complete search history.

(56) References Cited

U.S. PATENT DOCUMENTS

2021/0288550 A1*   9/2021   Ishikawa .............. H02K 7/1815

* cited by examiner

*Primary Examiner* — Daniel C Puentes
*Assistant Examiner* — Minki Chang
(74) *Attorney, Agent, or Firm* — Lorenz & Kopf LLP

(57) ABSTRACT

In various embodiments, systems, apparatuses and methods are provided to distribute coolant to an electric motor. The apparatus includes a pan configured with a set of holes for coolant flow; an assembly including a set of bar linkages, a set of discs, and a single actuator motor wherein the assembly is attached to the pan wherein the single actuator motor is linked via bar linkages to discs that enable configuring a planar angle of the pan to obtain an optimum hole location of holes for coolant flow; and in response to external disturbances to the apparatus that redirect the coolant flow from the target region of the electric motor, the single actuator motor is controlled by an algorithm to change the planar angle of the pan to obtain the optimum hole location to direct coolant flow to the target region of the electric motor.

20 Claims, 6 Drawing Sheets

SYSTEMS, APPARATUSES, AND METHODS FOR ACTIVE END-TURN COOLING FOR AN ELECTRIC MOTOR WITH FOUR-BAR LINKAGES

INTRODUCTION

The technical field generally relates to oil-cooled motors and more particularly relates to methods, systems, and apparatuses for flow control of coolant to distribute the coolant evenly across the winding of a motor stator to prevent the emergence of hotspots that affect the operability and life of the motor.

Electric vehicles (EVs) are becoming commonplace and an alternative to internal combustion engine (ICE) vehicles to lower carbon emissions in the atmosphere. EVs operate via an electric motor powered by battery energy. In instances, the electric motor of an EV may use an oil cooling system. In this case, engine oil is used as a coolant to remove heat from the electric motor. The heat from the motor system is transferred via the heat exchanger from across the surface of the windings of an electric motor.

In a direct oil-cooled motor system, the coolant (oil) contacts the hot surface (i.e., the winding end turn as an example in the oil motor) directly. In an attempt to attain an optimum cooling performance of the oil motor, it is deemed necessary or optimum to have even coolant oil distribution over the hot surface of the oil motor's winding end turns to remove heat from the desired target region.

However, in an active end turn coolant oil flow system, the coolant oil flow direction is subject to external conditions that caused the active end turn coolant oil flow to not be distributed evenly over a planar surface or the desired hot surface exposed to the coolant oil flow. For example, the active end turns oil flow may be disrupted or disturbed by external factors such as road grade (slope of the road) as well as lateral acceleration at cornering actions of the vehicle. When this type of motion occurs to the vehicle, the translated effect is that the oil flow is no longer a continuous even flow over the winding surface or covering targeted regions. Rather, the oil flow is uneven and can even miss the target region, and the oil coverage, as a result, may, or will be significantly reduced; this, in turn, causes a deteriorating effect on the cooling efficiency. For example, because of the uneven distribution of the oil flow, hot spots may occur from the poor cooling of the engine winding, which may lead to an earlier failure of electric insulations than would normally be expected for the particular type of insulation used in the oil-cooled motor; this may also lead to the overall failure of the oil motor.

It is desired for a mechanism to improve the coolant oil distribution of an active end turn coolant system for a motor that encounters the commonplace negative effects of external forces or disturbances to the coolant oil flow that can be caused as an example by the vehicle traversing uneven surfaces or exhibiting lateral acceleration effects that interrupt or prevent a continuous even flow of the coolant oil over the engine windings.

It is desired to modify the coolant oil flow direction in a manner to counter the effects in disturbances of oil flow caused by different (i.e., not flat) road grades and the lateral acceleration experienced by the vehicle impinging the coolant oil for enhanced oil distribution and improved cooling efficiency.

It is desired to counter the external forces or disturbances with an active nozzle control where the nozzle direction is controlled to add the flexibility of 2-dimensional nozzle direction control.

Furthermore, other desirable features and characteristics of the present invention will become apparent from the subsequent detailed description and the appended claims, taken in conjunction with the accompanying drawings and the foregoing technical field and background.

SUMMARY

A system, apparatus, and method is disclosed for implementing a four bar linkage to direct coolant flow using a single actuator motor in response to external disturbances for a direct oil cooled electric motor.

In one exemplary embodiment, a system to distribute coolant to an electric motor is disclosed. The system includes a pan configured with a set of holes for coolant flow; an assembly including a set of bar linkages, a set of discs, and a single actuator motor wherein the assembly is attached to the pan wherein the single actuator motor is linked via the set of bar linkages to the set of discs that enables configuring a planar angle of the pan to obtain an optimum hole location of the set of holes for the coolant flow; a set of pipes configured to pass through the set of holes of the pan to distribute the coolant to a target region of the electric motor; and in response to external disturbances that redirect the coolant flow from the target region of the electric motor, the single actuator motor is configured for control by an algorithm to change the planar angle of the pan to obtain the optimum hole location to direct the coolant flow through the set of pipes to the target region of the electric motor.

In at least one exemplary embodiment, the system includes the single actuator motor that is configured to adjust by the algorithm the planar angle of the pan to cause the coolant flow to distribute evenly over the target region of the electric motor.

In at least one exemplary embodiment, the system includes the set of pipes including a combination of metal and rubber pipe wherein a metal pipe part passes through the set of holes in the pan and is respectively coupled to a set of nozzles for the coolant flow to distribute to the electric motor.

In at least one exemplary embodiment, the system includes the set of bar linkages including at least a pair of bar linkages coupled to the set of discs attached to the pan wherein the set of discs is controlled by the pair of bar linkages to move in a clockwise or counterclockwise direction that translates into two-dimensional planar movements of the pan that causes the set of nozzles to be redirected to enable the coolant flow to the target region of the electric motor.

In at least one exemplary embodiment, the system includes the target region of the electric motor, that includes winding end turns of a stator, wherein the winding end turns are distributed with the coolant evenly by the set of nozzles, wherein the coolant flow is directionally controlled by torque applied to the set of discs by the single actuator motor, whereby the planar angle of the pan is adjusted and the redirect the coolant flow.

In at least one exemplary embodiment, the system includes the single actuator motor that causes a redirect action to directionally adjust the coolant flow by applying the torque to each disc via the set of bar linkages that translates into the change in the lateral and rolling angles of a planar position of the pan enabling redirect of coolant flow to the target region of the electric motor.

In at least one exemplary embodiment, the set of bar linkages are controlled by using the algorithm for two-dimensional lateral planar movement of a nozzle direction over an external surface of the electric motor wherein each nozzle is coupled to a respective pipe of the set of pipes enabling the coolant flow to be distributed evenly across the external surface of the electric motor.

In at least one exemplary embodiment, the system includes a first bar of the set of bar linkages attached at an end to an exterior location of a first disc, and a second bar of the set of bar linkages attached to an opposite end of the bar linkage to the exterior location of a second disc, and a middle point between the first and second bars are attached to the pan, wherein the torque applied by the single actuator motor that is connected to a gravity drive structure and causes rotation of both discs which translates into lateral and rolling angle changes of the planar position of the pan by shifting of each bar of the set of bar linkages resulting in the redirect of the nozzle direction for the coolant flow in response to the external disturbances.

In at least one exemplary embodiment, the system includes the single actuator motor configured by the algorithm to obtain an achievable hole location for the coolant flow that has a minimum distance from a hole location to the target region of the electric motor.

In at least one exemplary embodiment, the system includes the single actuator motor configured by the algorithm to cause two-dimensional planar motion in a lateral plane for the pan to obtain the achievable hole location via a figure-eight pattern.

In yet another exemplary embodiment, an apparatus is provided. The apparatus includes an assembly coupled to a pan including a set of bar linkages, a set of discs, and an actuator motor wherein the actuator motor is linked via the set of bar linkages to the set of discs to enable configuring of a planar angle of the pan to obtain an optimum hole location of a set of holes for coolant flow; a set of pipes configured to pass through the set of holes of the pan to distribute coolant to a target region of an electric motor; and in response to external disturbances that redirect the coolant flow from the target region of the electric motor, the actuator motor is configured for control by an algorithm to change the planar angle of the pan to obtain the optimum hole location to direct the coolant flow through the set of pipes to the target region of the electric motor.

In at least one exemplary embodiment, the apparatus includes the actuator motor configured to adjust by the algorithm the planar angle of the pan to cause the coolant flow to distribute evenly over the target region of the electric motor.

In at least one exemplary embodiment, the apparatus includes the set of pipes including a combination of metal and rubber pipe wherein a metal pipe part passes through the set of holes in the pan and is respectively coupled to a set of nozzles for the coolant flow to distribute to the electric motor.

In at least one exemplary embodiment, the apparatus includes the set of bar linkages including at least a pair of bar linkages coupled to the set of discs attached to the pan wherein the set of discs is controlled by the pair of bar linkages to move in a clockwise or counterclockwise direction that translates into two-dimensional planar movement of the pan that causes the set of nozzles to be redirected to enable the coolant flow to the target region of the electric motor.

In at least one exemplary embodiment, the apparatus includes the actuator motor is configured to cause a redirect action to directionally adjust the coolant flow by applying a torque to each disc via the set of bar linkages that translates into the change in the lateral and rolling angles of a planar position of the pan enabling redirect of coolant flow to the target region of the electric motor.

In at least one exemplary embodiment, the set of bar linkages are controlled by using the algorithm for two-dimensional lateral planar movement of a nozzle direction over an external surface of the electric motor wherein each nozzle is coupled to a respective pipe enabling the coolant flow to be distributed evenly across the external surface of the electric motor.

In at least one exemplary embodiment, the apparatus includes the actuator motor controlled by the algorithm to obtain an achievable hole location for the coolant flow that has a minimum distance from a hole location to the target region of the electric motor.

In at least one exemplary embodiment, the apparatus includes the single actuator motor controlled by the algorithm to cause two-dimensional planar motion in a lateral plane for the pan to obtain the achievable hole location via a figure-eight pattern.

In yet another exemplary embodiment a method to distribute coolant evenly across an exterior surface of an electric motor is provided. The method includes configuring an assembly coupled to a pan including a set of bar linkages, a set of discs, and an actuator motor wherein the actuator motor is linked via the set of bar linkages to the set of discs to enable configuring of a planar angle of the pan to obtain an optimum hole location of a set of holes for coolant flow; configuring a set of pipes configured to pass through the set of holes of the pan to distribute the coolant to a target region of the electric motor; and in response to external disturbances that redirect the coolant flow from the target region of the electric motor, configuring the actuator motor for control by an algorithm to change the planar angle of the pan to obtain the optimum hole location to direct the coolant flow through the set of pipes to the target region of the electric motor.

In at least one exemplary embodiment, the method includes controlling the actuator motor by the algorithm to cause the change to the planar angle of the pan to obtain an achievable hole location for the coolant flow that has a minimum distance from a hole location to the target region of the electric motor.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1A:
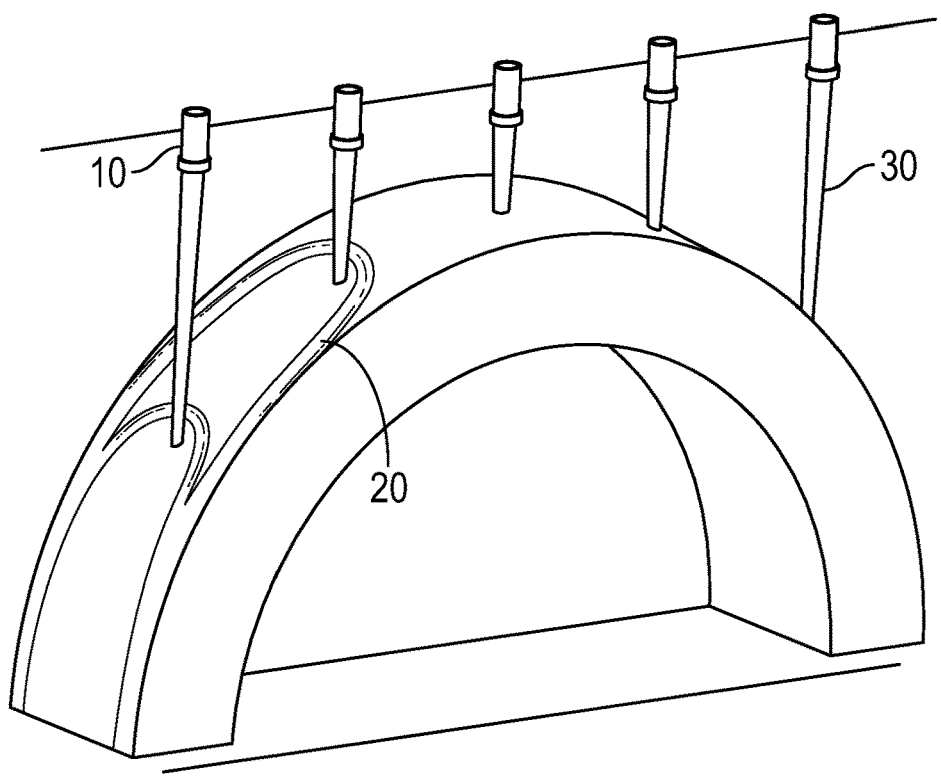
FIGS. 1A and 1B illustrate an exemplary diagram of side views of wetted areas representing the surface of the end turn windings of the stator of an electric motor that change in accordance with different accelerations of an electric vehicle of exemplary embodiments.

The following detailed description is merely exemplary in nature and is not intended to limit the application and uses. Furthermore, there is no intention to be bound by any expressed or implied theory presented in the preceding technical field, background, summary, or the following detailed description.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems and that the systems described herein are merely exemplary embodiments of the present disclosure.

The present disclosure describes systems, apparatuses, and methods for an active end turn coolant flow system to prevent the coolant oil from missing the design target location of a hot surface of an electric motor that can occur when there are external disturbances such as a nonzero road grade and/or lateral acceleration from cornering. In this instance, a novel linkage is devised where a two-dimensional or multi-directional control is achieved with only a single actuator.

The present disclosure describes systems, apparatuses, and methods for coolant oil control in at least two directions that do not require two actuators for each directional control rather rely on a single actuator for two-directional control that results in an improvement in coolant distribution while minimizing system complexity for such control.

The present disclosure describes systems, apparatuses, and methods for an active end turn coolant flow system that operates as an active system and does not require active sensors or multiple actuators, and controllers (i.e., only a single actuator) that increase the cost and complexity of the cooling oil system.

The present disclosure describes systems, apparatuses, and methods for an active end turn coolant flow system that utilizes a four-bar linkage which enables two-dimensional control with a single actuator.

The present disclosure describes systems, apparatuses, and methods for an active end turn coolant flow system that implements the four-bar linkage configuration with a figure-eight motion path to distribute coolant oil at target hole locations for optimum cooling. In this case, the target hole locations used are deemed the most achievable hole location which has a minimum distance from the target hole location. Also, the angle of coolant flow is configured with the four-bar linkage of the motor which achieves the likely or achievable hole location.

The present disclosure describes systems, apparatuses, and methods for an active end-turn cooling system for an electric motor that actively controls the direction of the oil drop to avoid oil maldistribution due to external vehicle forces of at least lateral and rolling acceleration, that enables active oil distribution via metallic pipes and rubbers underneath an oil sump. Also, the present disclosure describes a pan attached to a 4-bar linkage with a (stepping) motor to implement the directional flow control by adjusting the planar pan angle by the movement of the bar linkages coupled to an actuator movement motor. In this instance, the metallic pipes are configured to pass through holes in the pan. The direction of the pipes can be controlled by the angle of a motor control algorithm that is enabled to change the direction angle of the coolant flow in the pan depending on the lateral and rolling acceleration or vehicle status (i.e., dynamic or static movement).

Figure 1B:
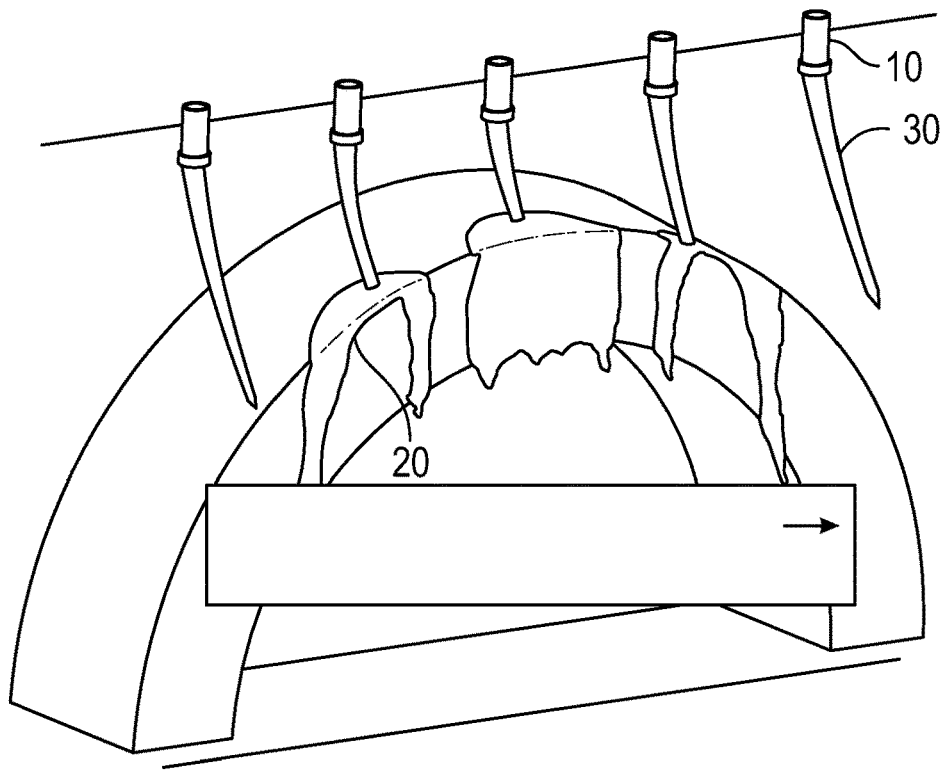

FIGS. 1A and 1B illustrate side views of wetted areas (of coolant oil) representing the surface of the end turn windings of the stator of an electric motor that change in accordance with different accelerations of an electric vehicle of exemplary embodiments. In FIG. 1A there is shown a nozzle 10 that distributes coolant over a hot surface or planar area (e.g. end turn windings) of an electric motor where the flow of the coolant is caused by a gravity drive. The coolant flow 30 is distributed evenly over surface 20 with the coolant directed to multiple target regions on surface 20 because there are no external disturbances caused by the zero lateral acceleration. In FIG. 1B, there is shown a significant reduction in coolant over multiple target regions of the surface 20 because the coolant flow 30 is swayed away or redirected from the target regions because of forces applied by vehicle acceleration (in this case, 1G lateral acceleration). This results in a significant reduction in the wetted area that is exposed to the coolant and this, in turn, causes poor cooling performance.

Figure 2:
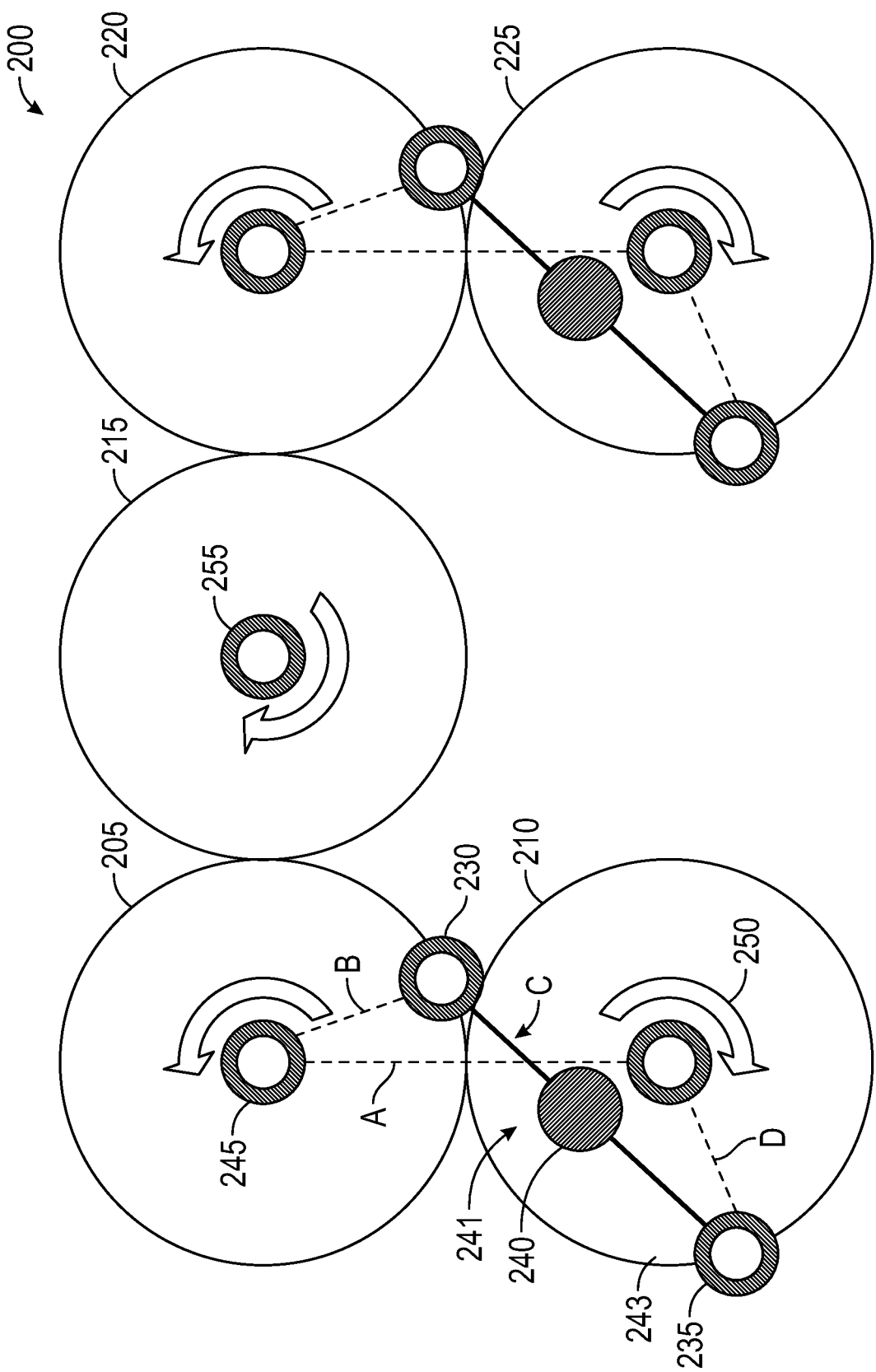
FIG. 2 illustrates an exemplary diagram of a top view of a four-bar linkage that is attached to a pan with a stepping motor where the direction of the pipes can be controlled by the angle of the motor depending on external forces or vehicle status in accordance with an exemplary embodiment.

FIG. 2 illustrates an exemplary diagram of a top view of a four-bar linkage that is attached to a pan with a stepping motor where the direction of the pipes can be controlled by the angle of the motor depending on external forces or vehicle status in accordance with an exemplary embodiment. In FIG. 2, in the top view exemplary diagram, there is an assembly 200 that enables a single actuator motor 215 to apply a torque in response to an external disturbance to change the planar angle of a pan (not shown) to obtain the optimum hole location to which to direct the coolant flow through a set of pipes to the external surface of a target region of an electric motor. The assembly 200 includes a set of multiple discs (205, 220, 210, 225) that are linked to the single actuator motor 215. A torque 255 applied in a clockwise or counterclockwise direction by the single actuator motor 215 is translated to each of the discs (205, 220, 210, 225), to control the movement of each disc which in turn enables the location of endpoints of a 4 bar linkage to move in a manner that causes a change of the planar angle of the pan (not shown) to obtain the optimum hole location for the coolant flow.

In an exemplary embodiment, a four-bar linkage is a plane mechanism consists of four links that form rotating kinematic pairs. The four-bar linkage consists of a fixed link and two rotating links.

In FIG. 2, the four bar linkage consists of sections (A), (B), (C), and (D). The bar linkage of section (C) is made up of two parts of a bar linkage that connect two different discs. The first part, or bar linkage part 243 connects an exterior point 235 of disc 210 and to a point 240, and the second part or bar linkage part 241 connects to an exterior point 230 of disc 205 to point 240. The point 240 can be affixed to a section of a pan.

In an exemplary embodiment, as a clockwise torque 255 is applied by the single actuator motor 215, the disc 205 may receive the counterclockwise torque and rotate in a counterclockwise direction 245. Since, the end of the bar linkage of section (C) is configured to connect at an exterior point 235 of disc 210 with the opposite end at 230 connected to the exterior point 230 of disc 205. As the disc 205 rotates in one direction, and the disc 210 rotates in the opposite direction, the lateral and rolling angles between each bar linkage part will change as the distance by virtue of both disc rotations to the point 240 (i.e., change in the bar linkage parts (241, 243) relation to each). This translates into two-dimensional lateral planar movement of a nozzle direction over the external surface of the electric motor where each nozzle (not shown) is coupled to a respective pipe of the set of pipes enabling the coolant flow to be distributed evenly across the external surface of the electric motor. Further, the single actuator motor 215 is controlled by an algorithm to obtain an achievable hole location for the coolant flow that has a minimum distance from a hole location to the target region of the electric motor by two-dimensional planar motion in a lateral plane for the pan via a figure eight pattern.

Figure 3:
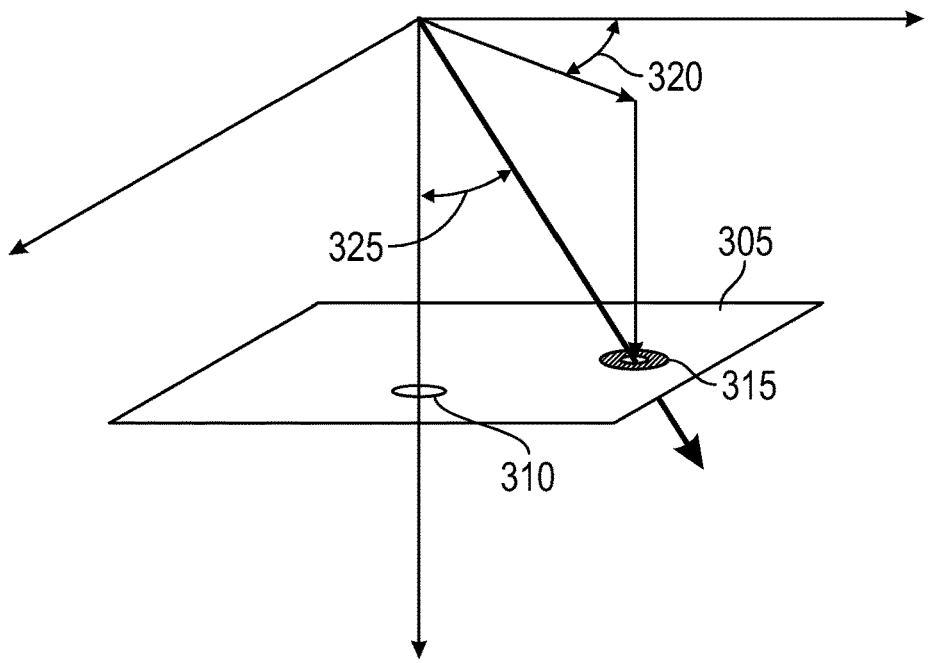
FIG. 3 illustrates an exemplary diagram of a side view of a plane and lateral and rolling angles for changing a default hole location to a target hole location for flow distribution of the coolant via the pipes over the external surface of the electric motor in accordance with an exemplary embodiment.

FIG. 3 illustrates an exemplary diagram of a side view of a plane and lateral and rolling angles for changing a default hole location to a target hole location for flow distribution of the coolant via the pipes over the external surface of the electric motor in accordance with an exemplary embodiment. To obtain lateral and rolling angles to get target hole location. The planar position of the pan is depicted by plane 305 with a target hole location 315, and a default hole location 310. The actuator motor 215 (in FIG. 2), applies a torque and rotation amount as determined by an algorithm to cause a movement in the four bar linkage that moves the plane 305 so that the default hole location 310 is adjusted to the most achievable hole location which has a minimum distance from the target hole location 315. The actuator motor 215 (in FIG. 2) obtains the rolling angle 325 and lateral angle 320 based on control actions by the algorithm to achieve the most achievable hole location.

Figure 4:
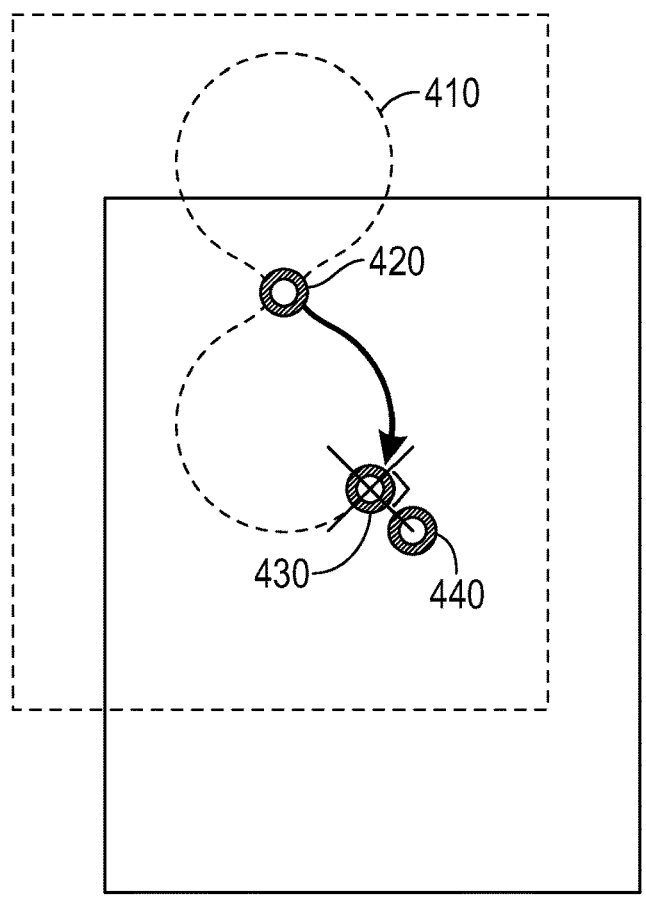
FIG. 4 illustrates exemplary diagrams of a top view of the motion path by the actuator which follows a figure-eight design to achieve the optimum hole location to a target hole location of the coolant system with flow across the end turn windings of the stator of an electric motor in accordance with an exemplary embodiment.

FIG. 4 illustrates exemplary diagrams of a top view of the motion path by the actuator motor using the four-bar linkage for planar motion in a figure-eight design to achieve the optimum hole location to a target hole location of the coolant system with flow across the end turn windings of the stator of an electric motor in accordance with an exemplary embodiment. In FIG. 4, the motion path which is shown which the actuator motor is programmed to follow to achieve the optimum hole location to a target hole location of the coolant system with flow across the end turn windings of the stator of an electric motor is contemplated as an exemplary pattern configuration that can be modified as desired. Hence, it is contemplated that the two-dimensional motion path described of a figure-eight pattern may be modified or changed depending on a desired response to external disturbance to control nozzle directions and coolant flow.

In FIG. 4, the actuator motor 215 is programmed to cause a motion path of the default hole location 420 in an attempt to achieve the most achievable hole location 430 to follow a figure-eight 410 pattern by actions of the actuator motor 215 to apply torque to the set of discs coupled to the four-bar linkages. That is, the clockwise and counterclockwise actions by the actuator motor 215 are translated into two-dimensional planar movement of the plane 305 (i.e., pan plane position) in the lateral X and Y coordinate directions that follow the figure-eight 410 pattern.

Figure 5:
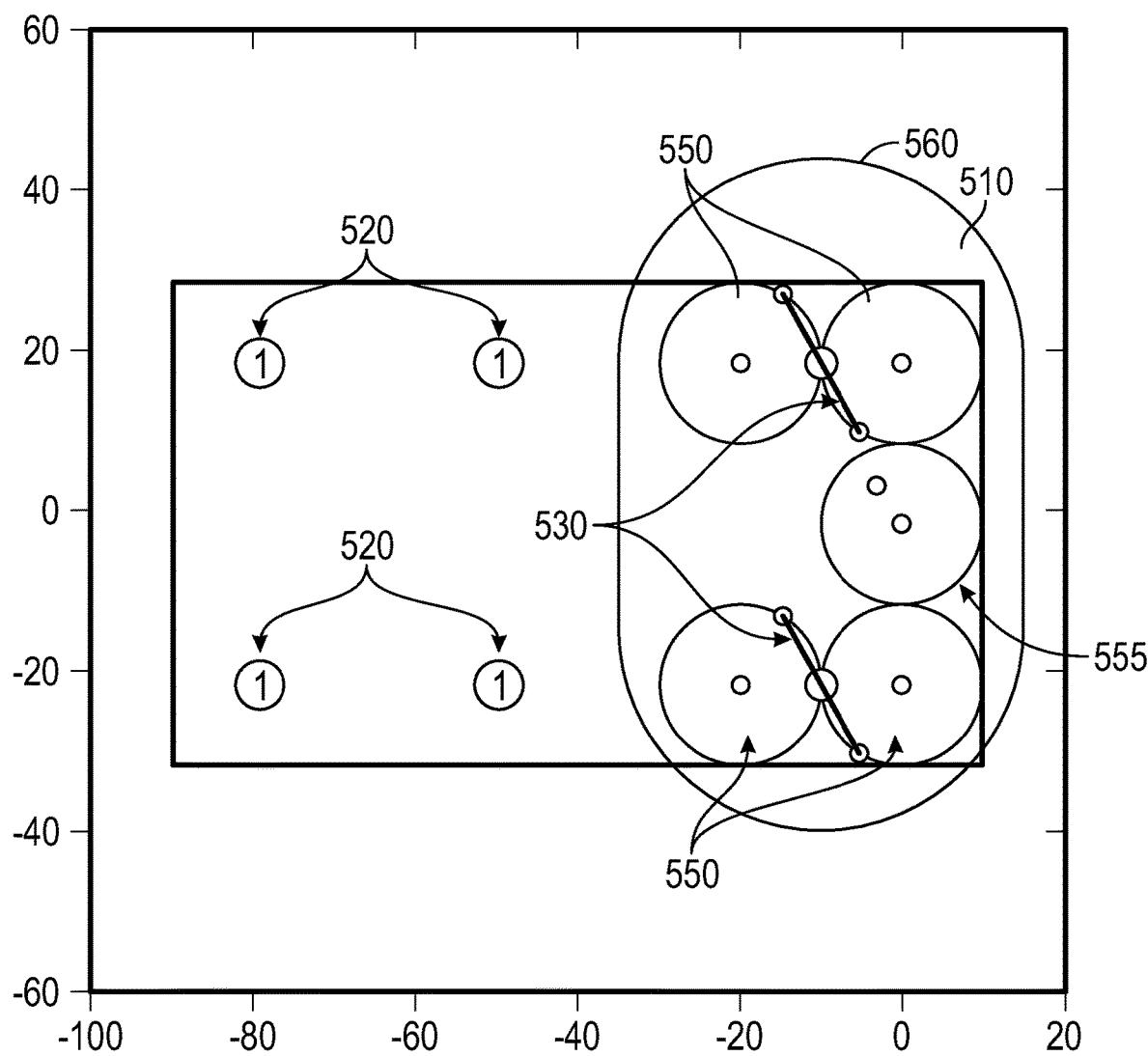
FIG. 5 illustrates an exemplary diagram of default hole location for a pan and the pan location of the assembly containing the four-bar linkage, actuator motor, and discs used to achieve the optimum hole location in accordance with an exemplary embodiment.

FIG. 5 illustrates an exemplary diagram of the active end-turn cooling system for the electric motor with the default hole locations and assembly contained within the pan to achieve the optimum hole location in accordance with an exemplary embodiment. FIG. 5 depicts a pan 510 with a set of holes 520 positioned at respective four hole locations in the pan 510. The assembly 560 for the two-dimensional control is depicted with the elements that include the single actuator motor 555, set of discs 550, and four-bar linkage 530 positioned on one side of the pan 510 while the set of holes 520 are positioned on the otherside.

In an exemplary embodiment, the actuator motor 555 actively controls as instructed by the algorithm, the direction of the oil drop to avoid oil maldistribution due to lateral and rolling acceleration. The metallic pipes and rubbers underneath the oil sump (not shown) pass through the set of holes 520 and are coupled to a set of nozzles. The pan 510 is attached to a 4-bar linkage 530 and the metallic pipes passing through holes 520 on the pan 510. The direction of the pipes are controlled by the angle of the actuator motor 555. The control algorithm changes the direction angle depending on the lateral and rolling acceleration or vehicle status (moving or stopped).

Figure 6:
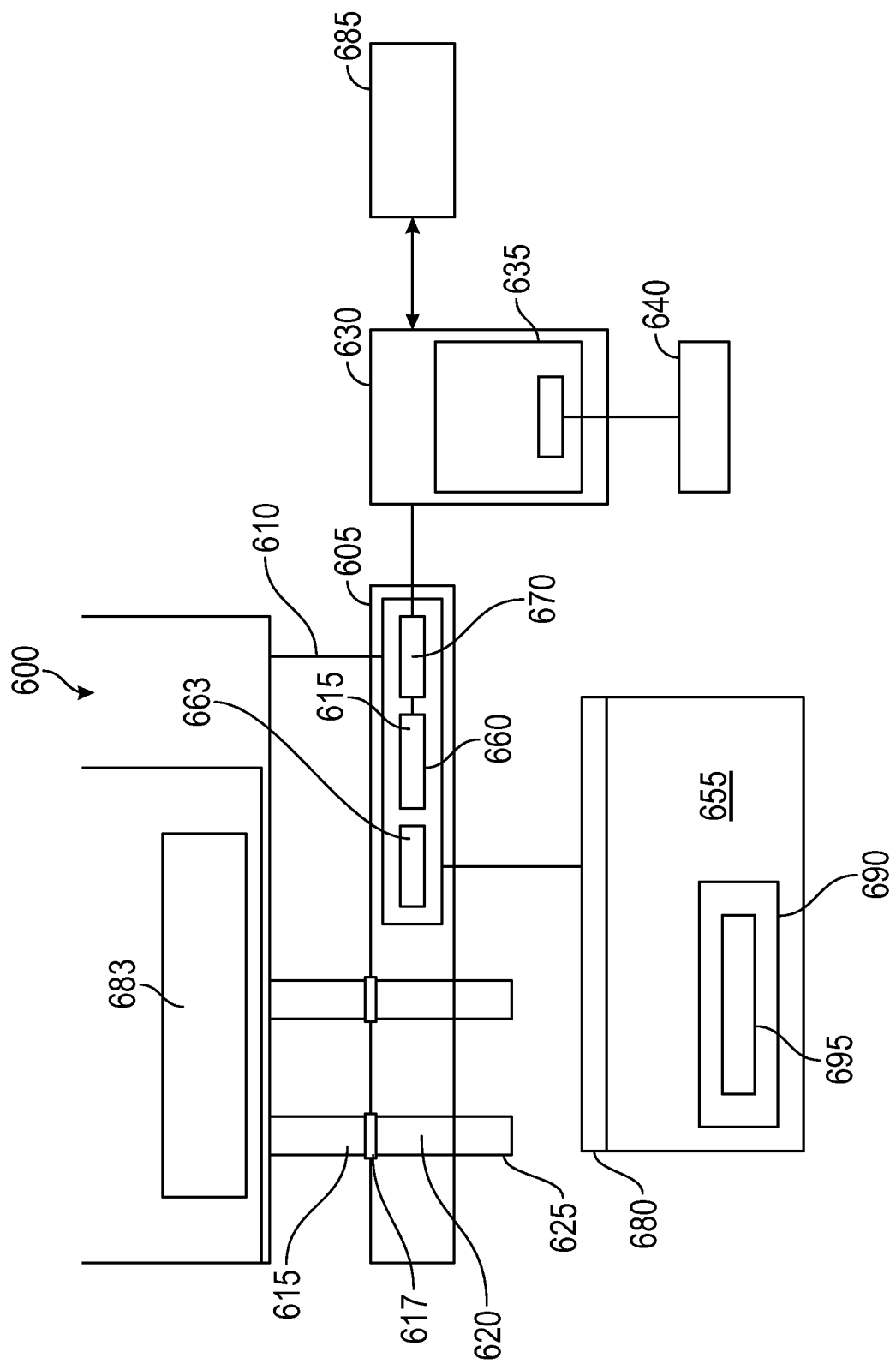
FIG. 6 illustrates an exemplary diagram of gravity driven coolant system that depicts a combination of the various elements with a controller to implement the active controls of the direction of the oil drop to avoid maldistribution due to lateral and rolling acceleration in accordance with en exemplary embodiment.

FIG. 6 illustrates an exemplary diagram of gravity driven coolant system that depicts a combination of the various elements with a controller to implement the active controls of the direction of the oil drop to avoid maldistribution due to lateral and rolling acceleration in accordance with en exemplary embodiment. FIG. 6 depicts a gravity driven coolant flow system 600 that includes an oil sump 683, a rubber pipe 615 coupled with a mettalic pipe 620 passing though a default location hole 617 of pan 605 and connected to a nozzle 625 for coolant flow and to distribute coolant over the target region of the external surface 680 of the electric motor 655.

The assembly 660 contained in the pan 605 and positioned as described in FIG. 5 on one side of the pan 605 containing the elements of a four bar linkage 663 connected to the pan 605, and further coupled to the set of discs 665, and the actuator motor 670. The actuator motor 670 is connected to a controller 630 that controls the direction of the pipes and nozzle by the angle of the actuator motor 670, and attached at 610 to the gravity driven coolant flow system. The controller 630 includes a memory 635 for storing programmed instructions of a control algorithm 640 to change the angle depending on the lateral and folling acceleration or the vehicle status.

The control algorithm 640 is configured to counter the external disturbances from a sensor input 685 to correct for the direction of a disturbance which may not be aligned to a vehicle direction, and to cause the nozzle location to move in two-dimensions to counter the disturbance. The four-bar linkage 663 enables the two-dimensional control by the control algorithm 640 using only a single actuator motor 670 rather than multiple actuator motors to move in two dimensions in the an XY plane to achieve the most achievable default hole location 617 for coolant flow over the target region of the external surface 680 of the electric motor 655. The electric motor 655 includes a stator 690, and end turn windings 695. The end turn windings 695 is where the conductors (windings) make turns to be connected to other straight parts. The cooling from the (oil) coolant flow occurs for the most part over the end turn (i.e., target region) because it is the only area that is exposed to the coolant via nozzle 625.

Figure 7:
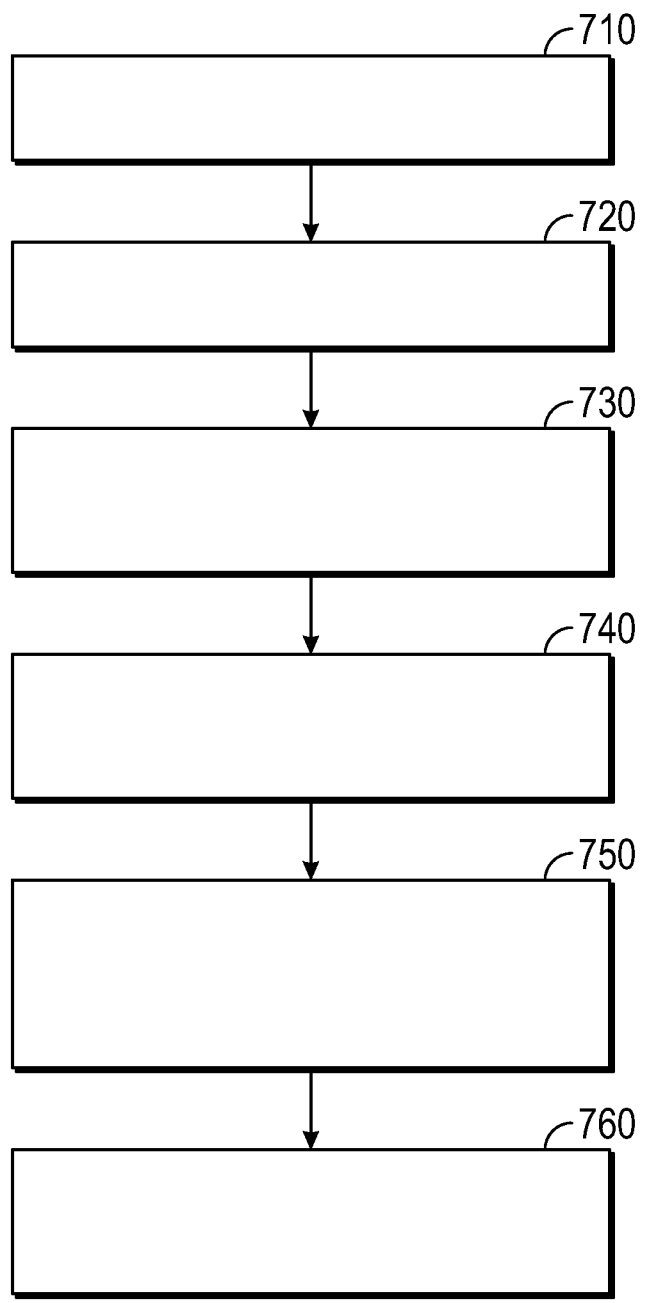
FIG. 7 illustrates an exemplary flowchart of two-dimensional directions that the pipes are directed in response to different external forces caused by vehicle operation for flow distribution of the coolant over the external surface of the electric motor in accordance with an exemplary embodiment.

FIG. 7 illustrates an exemplary flowchart of two-dimensional directions that the pipes are directed in response to different external forces caused by vehicle operation for flow distribution of the coolant over the external surface of the electric motor in accordance with an exemplary embodiment.

In FIG. 7, at step 710, the controller obtains a lateral and rolling angles to target hole location in response to sensor input to counter an external disturbance. At step 720, the controller obtains the most achievable hole location which has the minimum distance from the target hole location. At step 730, controller obtains the angle of the actuator motor which achieves the most achievable hole location. At step 740, the controller based on a control algorithm causes the single actuator motor to apply a clockwise or counterclockwise action to change the lateral and rolling angle of the plane of the pan via the four bar linkage. At step 750, the change in the lateral and rolling angle of the plane is translated via the four bar linkage into a two dimensional XY coordinate change of the default hole location to the achievable hole location. At step 760, the nozzle direction is redirected by the two dimensional control action of the controller to enable coolant flow to the target region of the external surface of the electric motor.

It should be appreciated that the process of FIG. 7 may include any number of additional or alternative tasks, the tasks are shown in FIG. 7 need not be performed in the illustrated order, and the process of FIG. 7 may be incorporated into a more comprehensive procedure or process having additional functionality not described in detail herein. Moreover, one or more of the tasks shown in FIG. 7 may be omitted from an embodiment of the process shown in FIG. 7 as long as the intended overall functionality remains intact.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or exemplary embodiments are only examples and are not intended to limit the scope, applicability, or configuration of the disclosure in any way. Rather, the foregoing detailed description will provide those skilled in the art with a convenient road map for implementing the exemplary embodiment or exemplary embodiments.

It should be understood that various changes may be made in the function and arrangement of elements without departing from the scope of the disclosure as set forth in the appended claims and the legal equivalents thereof.

What is claimed is:

1. A system to distribute coolant to an electric motor in an apparatus, comprising:
   a pan configured with a set of holes for coolant flow;
   an assembly comprising a set of bar linkages, a set of discs, and a single actuator motor wherein the assembly is attached to the pan in the apparatus wherein the single actuator motor is linked via the set of bar linkages to the set of discs that enables configuring a planar angle of the pan to obtain an optimum hole location of the set of holes for the coolant flow;
   a set of pipes configured to pass through the set of holes of the pan to distribute the coolant to a target region of the electric motor; and
   in response to external disturbances to the apparatus that redirect the coolant flow from the target region of the electric motor, the single actuator motor is configured for control by an algorithm to change the planar angle of the pan to obtain the optimum hole location to direct the coolant flow through the set of pipes to the target region of the electric motor.

2. The system of claim 1, further comprising:
   the single actuator motor is configured to adjust by the algorithm the planar angle of the pan to cause the coolant flow to be distributed evenly over the target region of the electric motor.

3. The system of claim 1, further comprising:
   the set of pipes comprising a combination of metal and rubber pipe wherein a metal pipe part passes through the set of holes in the pan and is respectively coupled to a set of nozzles for the coolant flow to distribute to the electric motor.

4. The system of claim 3, further comprising:
   the set of bar linkages comprising at least a pair of bar linkages coupled to the set of discs and attached to the pan wherein the pair of bar linkages is controlled by the set of discs to move in a clockwise or counterclockwise direction that translates into two-dimensional planar movements of the pan that causes the set of nozzles to be redirected to enable the coolant flow to the target region of the electric motor.

5. The system of claim 4, further comprising:
   the target region of the electric motor comprises winding end turns of a stator wherein the winding end turns are distributed with the coolant evenly by the set of nozzles wherein the coolant flow is directionally controlled by torque applied to the set of discs by the single actuator motor whereby the planar angle of the pan is adjusted and the redirect the coolant flow.

6. The system of claim 5, further comprising:
   the single actuator motor causes a redirect action to directionally adjust the coolant flow by applying the torque to each disc via the set of bar linkages that translates into a change in a lateral and rolling angles of a planar position of the pan enabling redirect of coolant flow to the target region of the electric motor.

7. The system of claim 6, wherein the set of bar linkages are controlled by using the algorithm for two-dimensional lateral planar movement of a nozzle direction over an external surface of the electric motor wherein each of the nozzles is coupled to a respective pipe of the set of pipes enabling the coolant flow to be distributed evenly across the external surface of the electric motor.

8. The system of claim 7, further comprising:
a first bar of the set of bar linkages attached at an end of the set of bar linkages to an exterior location of a first disc, and a second bar of the set of bar linkages attached to an opposite end of the set of bar linkages to an exterior location of a second disc, and a middle point between the first and second bars are attached to the pan wherein the torque applied by the single actuator motor that causes rotation of both discs which translates into the change in the lateral and rolling angles of the planar position of the pan by shifting of each of the bars of the set of bar linkages resulting in a redirect of the nozzle direction for the coolant flow in response to the external disturbances to the apparatus.

9. The system of claim 1, further comprising:
the single actuator motor is configured by the algorithm to obtain an achievable hole location for the coolant flow that has a minimum distance from a hole location to the target region of the electric motor.

10. The system of claim 9, further comprising:
the single actuator motor is configured by the algorithm to cause two-dimensional planar motion in a lateral plane for the pan to obtain the achievable hole location via a figure-eight pattern.

11. An apparatus comprising:
an assembly coupled to a pan comprising a set of bar linkages, a set of discs, and an actuator motor wherein the actuator motor is linked via the set of bar linkages to the set of discs to enable configuring of a planar angle of the pan to obtain an optimum hole location of a set of holes for coolant flow;
a set of pipes configured to pass through the set of holes of the pan to distribute coolant to a target region of an electric motor; and
in response to external disturbances to the apparatus that redirect the coolant flow from the target region of the electric motor, the actuator motor is configured for control by an algorithm to change the planar angle of the pan to obtain the optimum hole location to direct the coolant flow through the set of pipes to the target region of the electric motor.

12. The apparatus of claim 11, further comprising:
the actuator motor is configured to adjust by the algorithm the planar angle of the pan to cause the coolant flow to distribute evenly over the target region of the electric motor.

13. The apparatus of claim 12, further comprising:
the set of pipes comprise a combination of metal and rubber pipe wherein a metal pipe part passes through the set of holes in the pan and is respectively coupled to a set of nozzles for the coolant flow to distribute to the electric motor.

14. The apparatus of claim 13, further comprising:
the set of bar linkages comprising at least a pair of bar linkages coupled to the set of discs, and attached to the pan wherein the pair of bar linkages is controlled by the set of discs to move in a clockwise or counterclockwise direction that translates into two-dimensional planar movement of the pan that causes the set of nozzles to be redirected to enable the coolant flow to the target region of the electric motor.

15. The apparatus of claim 14, further comprising:
the actuator motor is configured to cause a redirect action to directionally adjust the coolant flow by applying a torque to each disc via the set of bar linkages that translates into a change in a lateral and rolling angles of a planar position of the pan enabling redirect of coolant flow to the target region of the electric motor.

16. The apparatus of claim 15, wherein the set of bar linkages is controlled by using the algorithm for two-dimensional lateral planar movement of a nozzle direction over an external surface of the electric motor wherein each of the nozzles is coupled to a respective pipe enabling the coolant flow to be distributed evenly across the external surface of the electric motor.

17. The apparatus of claim 11, further comprising:
the actuator motor is controlled by the algorithm to obtain an achievable hole location for the coolant flow that has a minimum distance from a hole location to the target region of the electric motor.

18. The apparatus of claim 17, further comprising:
the actuator motor is controlled by the algorithm to cause two-dimensional planar motion in a lateral plane for the pan to obtain the achievable hole location via a figure-eight pattern.

19. A method to distribute coolant evenly across an exterior surface of an electric motor of an apparatus, comprising:
configuring an assembly coupled to a pan of the apparatus comprising a set of bar linkages, a set of discs, and an actuator motor wherein the actuator motor is linked via the set of bar linkages to the set of discs to enable configuring of a planar angle of the pan to obtain an optimum hole location of a set of holes for coolant flow;
configuring a set of pipes to pass through the set of holes of the pan to distribute the coolant to a target region of the electric motor; and
in response to external disturbances to the apparatus that redirect the coolant flow from the target region of the electric motor, configuring the actuator motor for control by an algorithm to change the planar angle of the pan to obtain the optimum hole location to direct the coolant flow through the set of pipes to the target region of the electric motor.

20. The method of claim 19, further comprising:
controlling the actuator motor by the algorithm to cause the change to the planar angle of the pan to obtain an achievable hole location for the coolant flow that has a minimum distance from a hole location to the target region of the electric motor.

* * * * *